US007700369B2

(12) United States Patent
Massaro et al.

(10) Patent No.: US 7,700,369 B2
(45) Date of Patent: Apr. 20, 2010

(54) METHOD AND APPARATUS FOR APPLYING A PRESSURE DIFFERENTIAL TO A MULTI-WELL PLATE

(75) Inventors: Peter Massaro, Burlington, CT (US); Michael Catalano, Madison, CT (US)

(73) Assignee: Protedyne Corporation, Windsor, CT (US)

( * ) Notice: Subject to any disclaimer, the term of this patent is extended or adjusted under 35 U.S.C. 154(b) by 894 days.

(21) Appl. No.: 11/190,721

(22) Filed: Jul. 27, 2005

(65) Prior Publication Data

US 2006/0088448 A1 Apr. 27, 2006

Related U.S. Application Data

(60) Provisional application No. 60/591,507, filed on Jul. 27, 2004.

(51) Int. Cl.
*G01N 1/18* (2006.01)
*G01N 1/10* (2006.01)

(52) U.S. Cl. ....................... 436/177; 434/178; 434/180; 422/100; 422/101; 422/63

(58) Field of Classification Search ......... 422/100–101, 422/63–68.1; 436/177, 178, 180
See application file for complete search history.

(56) References Cited

U.S. PATENT DOCUMENTS

| | | | | |
|---|---|---|---|---|
| 4,927,604 | A | 5/1990 | Mathus et al. | |
| 5,039,493 | A * | 8/1991 | Oprandy | 422/101 |
| 5,334,352 | A * | 8/1994 | Johnson | 422/99 |
| 5,342,581 | A * | 8/1994 | Sanadi | 422/101 |
| 5,603,899 | A * | 2/1997 | Franciskovich et al. | 422/100 |
| 5,866,342 | A * | 2/1999 | Antonenko et al. | 435/7.1 |
| 6,083,761 | A * | 7/2000 | Kedar et al. | 506/30 |
| 6,133,045 | A * | 10/2000 | Johnson et al. | 436/177 |
| 6,159,368 | A | 12/2000 | Moring et al. | |
| 6,395,231 | B1 * | 5/2002 | Kraemer et al. | 422/100 |
| 6,403,379 | B1 * | 6/2002 | Munson et al. | 436/43 |
| 6,432,719 | B1 * | 8/2002 | Vann et al. | 436/180 |
| 6,485,690 | B1 | 11/2002 | Pfost et al. | |
| 6,498,240 | B1 | 12/2002 | Leonard et al. | |
| 6,514,463 | B2 * | 2/2003 | Zermani | 422/101 |

(Continued)

FOREIGN PATENT DOCUMENTS

| | | |
|---|---|---|
| EP | 1394269 A1 | 3/2004 |
| WO | WO 01/10886 A2 | 2/2001 |
| WO | WO 01/79486 A3 | 10/2001 |

OTHER PUBLICATIONS

International Search Report PCT/US2005/026582, mailing date Nov. 7, 2005.

*Primary Examiner*—Brian R Gordon
(74) *Attorney, Agent, or Firm*—Wolf, Greenfield & Sacks, P.C.

(57) ABSTRACT

A method and apparatus for moving material in a multi-well plate includes applying positive and negative pressure to one or more wells in the plate, e.g., to enhance a flow rate of material from the well through a filter element. Wells requiring application of positive pressure may be identified, e.g., by image analysis performed by a machine vision system. Those wells determined to require enhanced throughput may have negative and positive pressure applied to the well, while other wells have only negative pressure applied.

13 Claims, 1 Drawing Sheet

U.S. PATENT DOCUMENTS

| | | | | |
|---|---|---|---|---|
| 6,537,829 | B1 * | 3/2003 | Zarling et al. | 436/514 |
| 6,783,732 | B2 * | 8/2004 | Madden et al. | 422/63 |
| 6,867,005 | B2 * | 3/2005 | Keys et al. | 435/7.1 |
| 6,867,050 | B2 * | 3/2005 | Peck et al. | 506/40 |
| 6,887,431 | B1 * | 5/2005 | Vann et al. | 506/43 |
| 6,893,562 | B2 * | 5/2005 | Busnach et al. | 210/248 |
| 6,899,848 | B1 * | 5/2005 | Chen et al. | 422/63 |
| 6,989,099 | B2 * | 1/2006 | Busnach et al. | 210/650 |
| 7,112,281 | B2 * | 9/2006 | Busnach et al. | 210/650 |
| 7,122,155 | B2 * | 10/2006 | Waterbury et al. | 422/101 |
| 7,229,838 | B2 * | 6/2007 | Foster et al. | 436/180 |
| 7,347,975 | B2 * | 3/2008 | Vann et al. | 422/100 |
| 7,384,606 | B2 * | 6/2008 | Vann et al. | 422/104 |
| 7,452,510 | B2 * | 11/2008 | Weinfield et al. | 422/101 |
| 2001/0001643 | A1 * | 5/2001 | Simpson et al. | 422/101 |
| 2002/0004244 | A1 * | 1/2002 | Avdeef et al. | 436/171 |
| 2002/0006359 | A1 * | 1/2002 | Mathies et al. | 422/100 |
| 2002/0108898 | A1 * | 8/2002 | Zermani | 210/248 |
| 2003/0003021 | A1 * | 1/2003 | McGrath et al. | 422/99 |
| 2003/0021734 | A1 * | 1/2003 | Vann et al. | 422/100 |
| 2003/0035759 | A1 * | 2/2003 | Coyne et al. | 422/102 |
| 2003/0057106 | A1 * | 3/2003 | Shen et al. | 205/655 |
| 2003/0223912 | A1 * | 12/2003 | Knecht et al. | 422/100 |
| 2004/0022689 | A1 * | 2/2004 | Wulf et al. | 422/100 |
| 2004/0086426 | A1 * | 5/2004 | Vann et al. | 422/99 |
| 2004/0120860 | A1 * | 6/2004 | Ingenhoven | 422/100 |
| 2004/0266023 | A1 * | 12/2004 | Clark et al. | 436/180 |
| 2005/0074360 | A1 * | 4/2005 | DeWalch | 422/63 |
| 2005/0130318 | A1 * | 6/2005 | Vann et al. | 436/180 |
| 2005/0226786 | A1 * | 10/2005 | Hager et al. | 422/102 |
| 2005/0271551 | A1 * | 12/2005 | Shumate et al. | 422/100 |
| 2006/0051247 | A1 * | 3/2006 | Micklash et al. | 422/100 |

* cited by examiner

METHOD AND APPARATUS FOR APPLYING A PRESSURE DIFFERENTIAL TO A MULTI-WELL PLATE

This application claims the benefit of U.S. Provisional Application No. 60/591,507, filed Jul. 27, 2004.

The present application relates to the application of a pressure differential to one or more wells of a multi-well plate.

BACKGROUND OF INVENTION

Handling of material samples is commonly done with multi-well plates, i.e., sample holders having multiple individual wells that each hold a discrete sample. Such well plates may be handled using automated systems that subject the material samples to various processes, such as pipetting operations, thermocycling, separation, etc.

In one arrangement, such as that shown in U.S. Pat. No. 6,491,873 and/or U.S. Pat. No. 6,159,368, the wells in a multi-well plate are subjected to a vacuum that causes material in the sample wells to be drawn from the wells and through a filter. For example, a vacuum block or collar may be arranged at a lower side of the multi-well plate so that negative pressure may be applied to a lower end all of the wells in the plate. This negative pressure may cause the material in the wells to be drawn downwardly from the wells through an outlet at the lower end of the wells. The material in the wells may be drawn through a filter element, e.g., positioned in each of the wells, so that some of the material is trapped by the filter while liquid and/or smaller components of the material pass through the filter. The space above the multi-well plate is typically at atmospheric pressure during this process, and thus, the differential pressure that can be created across the wells is typically not greater than atmospheric pressure, e.g., typically less than 15 psi.

SUMMARY OF INVENTION

The inventors have appreciated several drawbacks to such filtering arrangements. For example, when a uniform vacuum is simultaneously applied to multiple wells, one or more leak paths into the vacuum space may be created once the contents of wells have been emptied. This leak path may increase the pressure in the vacuum space, and thus may reduce the differential pressure across the remaining wells of the plate. As the contents of additional wells are emptied, more leak paths may be created that further reduce the differential pressure and thus lengthen the time required to draw the contents from all wells in the plate. The inventors have also appreciated that it may be desirable in many applications to draw or filter the contents of the wells in a shorter time frame.

According to one aspect of the invention, a differential pressure, greater than may be accomplished with a vacuum block alone, may be applied across one or more wells in a multi-well plate. This greater pressure differential may reduce the amount of time required to empty the contents of each well in a given plate, and/or compensate for leak paths that are created during processing. The pressure differential may be created in some embodiments by placing a multi-well plate in communication with a vacuum block, and also placing a pressure manifold over the top of the plate to provide a pressure space over the wells. The pressure space above the plate may be charged to a pressure greater than atmospheric to provide for a greater differential pressure across the multi-well plate.

The pressure manifold may be equipped with a surface adapted to sealingly mate with a corresponding portion of the multi-well plate. The pressure manifold may also be attached to a pressure source, such as an air pump or compressed air supply, to provide positive pressure to the pressure space. Some embodiments may also include fasteners to secure the pressure manifold to the plate to prevent separation when pressure is created in the pressure space.

In one aspect of the invention, an apparatus to move contents in wells of a multi-well plate includes a multi-well plate having a plurality of wells, each of the plurality of wells including an inlet and an outlet, a vacuum source adapted to provide a negative pressure to an outlet of at least one of the plurality of wells, and a pressure source adapted to provide a positive pressure to an inlet of the at least one of the plurality of wells while the vacuum source provides the negative pressure to the outlet of the at least one of the plurality of wells.

In another aspect, the vacuum source may be adapted to provide a negative pressure to the outlets of a plurality of the wells, and the pressure source may be adapted to provide a positive pressure to one or more selected wells. Thus, in one embodiment, although vacuum may be applied to the outlets of all or most of the wells in the plate, positive pressure may be applied only to selected ones of the wells. For example, a robotic system may be adapted to couple the inlet of the one or more selected wells to the pressure source. This arrangement may allow the apparatus to cause the withdrawal of contents of a "problem" well, e.g., a well whose contents are not being drawn from the well because of a blockage or other reason.

In one embodiment, a machine vision system may provide information regarding the location of one or more selected wells to which positive pressure is applied. For example, the machine vision system may analyze wells to determine which, if any, of the wells has the most material remaining in the well. Based on the analysis, a determination may be made that positive pressure should be applied to the inlet of the well, e.g., to increase the pressure differential across the well and speed movement of material from the well. The machine vision system may determine the location of the well(s) and identify the location to a robotic system, which may in turn couple the well(s) to the pressure source.

In another aspect of the invention, a method for removing contents from wells of a multi-well plate includes providing a multi-well plate having a plurality of wells with each of the plurality of wells including a material contained in the well. A negative pressure is applied to the outlet of at least one of the wells in the multi-well plate, and a positive pressure is applied to the inlet of at least one of the wells while the negative pressure is applied to the outlet of the well.

These and other aspects of the invention will be apparent from the following description and claims.

BRIEF DESCRIPTION OF THE DRAWINGS

Aspects of the invention are described below with reference to the following drawing in which like numerals reference like elements, and wherein.

DETAILED DESCRIPTION

Figure 1:
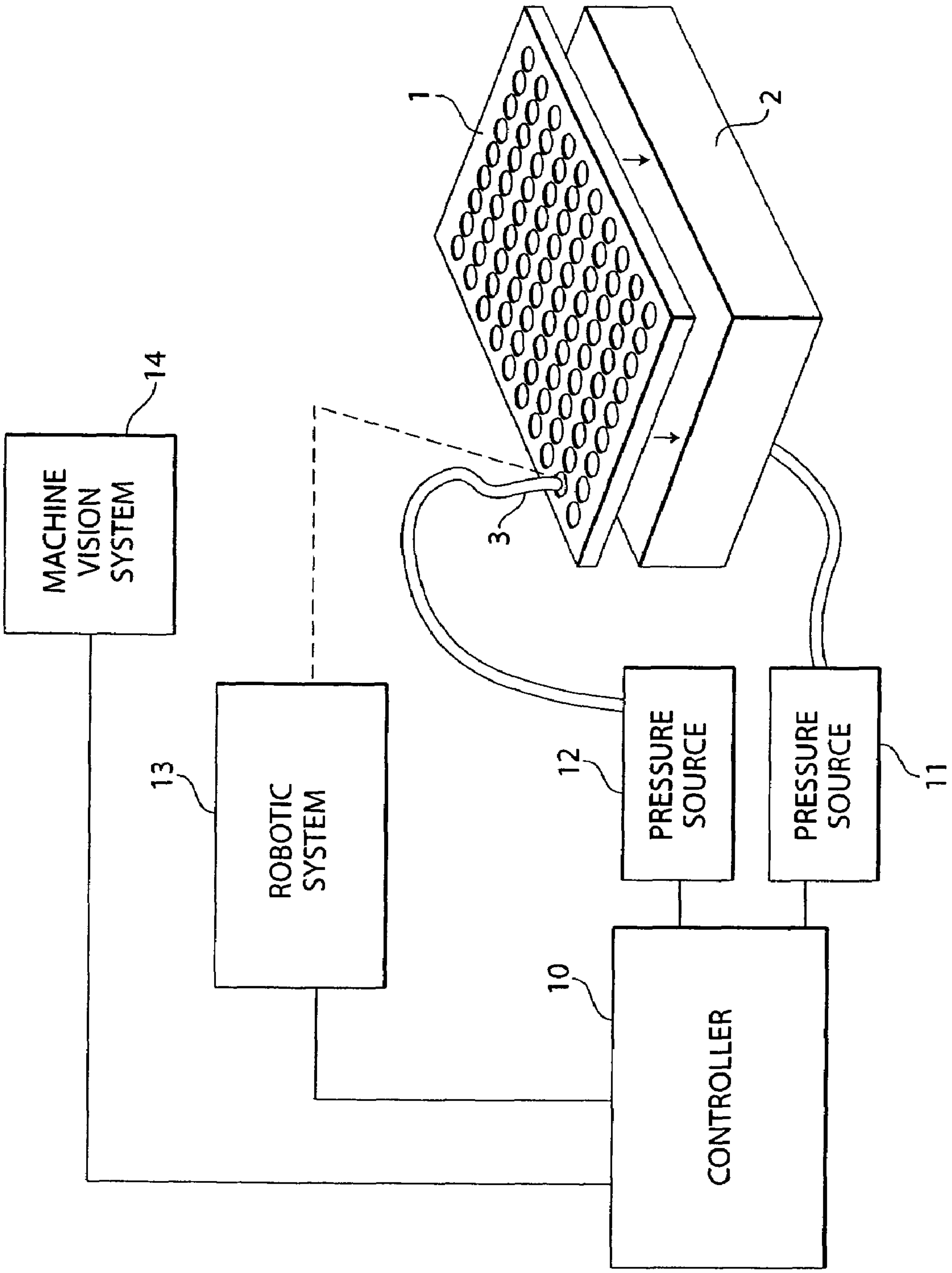
FIG. 1 is a schematic block diagram of a sample handling apparatus in accordance with aspects of the invention.

Aspects of the invention may be practiced using any suitable arrangement for a material sample handling apparatus. Several different embodiments are described herein for purposes of illustration. However, these illustrative embodiments should not be used to narrowly interpret the scope of the invention. In addition, various aspects of the invention are described herein, and these various aspects may be used in any suitable combination with each other, or alone.

FIG. 1 shows a schematic diagram of a sample handling apparatus in accordance with aspects of the invention. In this illustrative embodiment, one or more multi-well plates 1 may be operated on by the apparatus. Each of the multi-well plates may include several sample holding wells, e.g., 96, 384 or more wells, that each hold a sample material. The material may include a liquid component, e.g., that includes dissolved substances, suspended particles and/or other materials. For example, the sample material may include blood, DNA or other similar material, as well as chemicals, reagents, markers, or other substances that are used to react with or otherwise interact with the blood, DNA, etc.

The wells of the multi-well plate 1 may include an inlet, such as an opening at a top of the plate 1 shown in FIG. 1, and an outlet, such as an opening at a bottom of the plate. Such plate 1 arrangements are known in the art. The wells may also include a filter element, e.g., located in each well or at a lower end of the plate, through which material in the well is drawn. The plate 1 may be mated with a vacuum block 2 that may be arranged to seal with the plate 1 and create a negative pressure, or vacuum, environment at a bottom side of the plate 1. Such a negative pressure environment may urge material in the wells to be drawn toward the outlet of the wells, and, for example, through a filter element in each well. The negative pressure may be created by a pressure source 11, such as a vacuum pump, operating under the control of a controller 10.

In one aspect of the invention, the apparatus may include a machine vision system 14 or other arrangement to monitor the movement of material in the wells of the plate 1, e.g., while subjected to the vacuum created by the vacuum block 2. For example, the machine vision system 14 may analyze video images of the plate 1 while sample material is being drawn from the wells by the vacuum block 2. This analysis may determine whether one or more wells are progressing more slowly than other wells, e.g., whether the material in one or more wells is being removed more slowly than others. Those of skill in the art will appreciate other ways of monitoring the processing of wells in a plate, such as by optical, capacitive or other suitable sensors located close to or at each well in the plate 1. Such sensors may directly measure the amount of material in a corresponding well, and this information may be used by the controller 10 to determine which well(s) is progressing more slowly than others.

In one aspect of the invention, a positive pressure may be applied to one or more wells of a plate while the one or more wells are subjected to a negative pressure. For example, if the controller 10 determines, based on information from the machine vision system 14, that a particular well is having its material withdrawn too slowly, the controller 10 may control a pressure source 12 (e.g., an air pump or compressed air supply) to apply a positive pressure to an inlet side of the well, e.g., via a tube or manifold 3. The tube or manifold 3 may be coupled to the well in any suitable way, such as by a structure that fits over the entire top surface of the plate 1 and includes a valving or other arrangement to apply pressure to the selected well(s). In another embodiment, the tube or manifold 3 may couple with only one well rather than multiple wells. For example, the tube or manifold 3 may have a sealing member that engages with the plate near or in the well to create a pressure seal. Thereafter, positive pressure may be applied to the well by the pressure source 12. In one embodiment, a robotic system 13 may manipulate the tube or manifold 3 so as to couple the well(s) to the pressure source 12. For example, the robotic system 13 may include a sealing member and connection to the pressure source 12 so that the robotic system 13 can couple the sealing member to the selected well and apply a suitable positive pressure. Thus, the robotic system 13 may selectively couple one or more wells discretely to the pressure source 12 so that some of the wells have a positive pressure applied to their inlet, whereas other wells are subjected only to ambient pressure. The robotic system 13 may couple the tube or manifold 3 to the selected wells based on information from the machine vision system 14, e.g., information regarding the location of the well on the plate. Thus, the machine vision system 14 may be used to control the movement of the robotic system 13 in an open or closed loop manner, as is known in the art.

In another embodiment, all of the wells of the plate 1 may be simultaneously subjected to a positive pressure, e.g., where the manifold creates a common pressure space over all of the wells. Thus, the system need not necessarily be capable of applying positive pressure to selective ones of the wells.

According to aspects of the invention, the rate at which all wells in a sample holder are processed, e.g., during a filtering operation, may be increased. In addition, in some aspects of the invention, not necessarily all of the wells in a plate need be subjected to a positive pressure at the inlet side, which may cause foaming or other problems in some arrangements. Instead, only selected wells may be subjected to a positive pressure at the inlet.

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

The invention claimed is:

1. A method for removing contents from wells of a multi-well plate, the method comprising:

providing a multi-well plate having a plurality of wells, each of the plurality of wells including an inlet and an outlet and a material contained in the well;

applying a negative pressure to the outlets of a first number of selected wells in the multi-well plate;

identifying a second number of the selected wells as requiring application of positive pressure to the inlet, the second number being smaller than the first number; and applying a positive pressure only to the inlet of the second number of selected wells while the negative pressure is applied to the outlets of the selected wells, the application of negative and positive pressure to the second number of selected wells urging material in the second number of selected wells to move toward the outlet of the well.

2. The method of claim 1, further comprising using a machine vision system to provide information regarding a location of the second number of selected wells.

3. The method of claim 1, further comprising providing information to a robotic system to enable the robotic system to couple the second number of selected wells to a source of positive pressure.

4. The method of claim 2, wherein the machine vision system is adapted to identify a single well requiring application of positive pressure to the inlet of the well.

5. The method of claim 2, wherein the machine vision system is adapted to identify a single well requiring application of positive pressure to the inlet of the well based on an amount of material located in the well.

6. The method of claim 1, wherein each of the wells in the multi-well plate is associated with a filter element, and material in each of the wells is drawn through the filter element when a negative pressure is applied to the outlet of the wells.

7. The method of claim 1, wherein the first number of selected wells is all of the wells in the multi-well plate.

8. The method of claim 1, wherein the step of applying a positive pressure includes:

fluidly coupling a manifold to a pressure source and to the inlet of the second number of the selected wells to provide positive pressure only to the inlet of wells to which the manifold is fluidly coupled while a vacuum source provides the negative pressure to the outlets of the first number of selected wells.

9. The method of claim 8, wherein a robotic system couples the manifold to the inlet of the second number of selected wells.

10. The method of claim 9, wherein a machine vision system that provides information regarding a location of one or more wells to which the robotic system couples the manifold.

11. The method of claim 10, wherein the step of identifying the second number of the selected wells includes using the machine vision system to identify wells as requiring application of positive pressure to the inlet of the well.

12. The method of claim 11, wherein the machine vision system identifies a single well requiring application of positive pressure to the inlet of the well, and the step of applying a positive pressure includes using the robotic system to couple the manifold to the inlet of the single well.

13. The method of claim 11, wherein the machine vision system identifies a well as requiring application of positive pressure to the inlet of the well based on an amount of material located in the well.

* * * * *